(12) United States Patent
Thasari et al.

(10) Patent No.: US 12,395,381 B2
(45) Date of Patent: Aug. 19, 2025

(54) METHOD, APPARATUS, AND COMPUTER READABLE MEDIUM

(71) Applicant: RAKUTEN SYMPHONY, INC., Tokyo (JP)

(72) Inventors: Sri Venkata Gautham Thasari, Bangalore (IN); Venkatesh Muralidhara, Bangalore (IN); Hari Swaroop Kanzal Venkatesha, Bangalore (IN); Ayush Agrawal, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/248,055

(22) PCT Filed: Dec. 22, 2022

(86) PCT No.: PCT/US2022/053861
§ 371 (c)(1),
(2) Date: Apr. 6, 2023

(87) PCT Pub. No.: WO2024/136868
PCT Pub. Date: Jun. 27, 2024

(65) Prior Publication Data
US 2025/0088391 A1  Mar. 13, 2025

(51) Int. Cl.
*H04L 25/02* (2006.01)
*H04B 17/309* (2015.01)
*H04L 27/26* (2006.01)

(52) U.S. Cl.
CPC ......... *H04L 25/025* (2013.01); *H04B 17/346* (2023.05); *H04L 27/26035* (2021.01); *H04L 27/2675* (2013.01)

(58) Field of Classification Search
None
See application file for complete search history.

(56) References Cited

U.S. PATENT DOCUMENTS

| | | | | |
|---|---|---|---|---|
| 4,150,867 A * | 4/1979 | Knickerbocker | ...... | H05K 7/186 439/402 |
| 5,918,680 A * | 7/1999 | Maranghides | ..... | A62C 99/0018 169/46 |

(Continued)

FOREIGN PATENT DOCUMENTS

| | | | | |
|---|---|---|---|---|
| CA | 2723083 A1 * | 3/2018 | ............. | F25D 21/04 |
| CN | 1350379 A * | 5/2002 | .......... | H04J 13/0055 |

(Continued)

*Primary Examiner* — Berhanu Tadese
(74) *Attorney, Agent, or Firm* — HAUPTMAN HAM, LLP

(57) ABSTRACT

A method includes determining a least squares channel estimate (LSE) of a channel, removing a first Orthogonal cover code (OCC) sequence from the LSE thereby generating a first signal, determining an estimated timing offset of the first signal, adjusting a first timing of the LSE based on the estimated timing offset thereby generating a second signal with an adjusted timing, removing a second OCC sequence from the second signal thereby generating a third signal, determining a channel estimate of the channel based on the third signal, determining a noise power of a received signal, determining a signal power of the received signal, determining a signal to noise ratio (SNR) of the received signal based on the noise power and the signal power, adjusting a data rate of the channel based on the SNR, and transmitting an output signal based on an adjusted data rate of the channel.

20 Claims, 4 Drawing Sheets

(56) References Cited

U.S. PATENT DOCUMENTS

| | | | | |
|---|---|---|---|---|
| 6,792,052 | B1* | 9/2004 | Johansson | H04L 25/0242 375/354 |
| 7,035,353 | B2* | 4/2006 | Fimoff | H04L 25/025 375/346 |
| 7,706,324 | B2* | 4/2010 | Sutivong | H04W 74/002 370/442 |
| 8,073,393 | B2* | 12/2011 | Yu | H04L 25/025 370/320 |
| 8,259,669 | B2* | 9/2012 | Sutivong | H04W 74/04 370/332 |
| 8,339,930 | B2* | 12/2012 | Gore | H04L 5/0048 370/500 |
| 10,693,621 | B2* | 6/2020 | Bendlin | H04L 5/001 |
| 10,771,133 | B2* | 9/2020 | Lin | H04L 5/0048 |
| 11,190,329 | B2* | 11/2021 | Sengupta | H04W 72/23 |
| 11,930,465 | B2* | 3/2024 | Xiong | H04L 5/0094 |
| 12,028,198 | B2* | 7/2024 | Lu | H04J 13/0062 |
| 12,113,657 | B2* | 10/2024 | Thasari | H04W 72/23 |
| 12,218,863 | B2* | 2/2025 | Thasari | H04L 27/2636 |
| 2007/0283220 | A1* | 12/2007 | Kim | H03M 13/1148 714/758 |
| 2010/0070091 | A1* | 3/2010 | Watson | H02J 13/00004 700/278 |
| 2010/0195751 | A1* | 8/2010 | Orlik | H04L 25/20 375/267 |
| 2011/0182340 | A1* | 7/2011 | Primo | H04B 17/345 375/224 |
| 2012/0054577 | A1* | 3/2012 | Kim | H03M 13/1148 714/755 |
| 2013/0064313 | A1* | 3/2013 | Gatti | H04L 25/022 375/316 |
| 2013/0117623 | A1* | 5/2013 | Kim | H03M 13/2972 714/752 |
| 2014/0071233 | A1* | 3/2014 | Lim | H04N 19/597 348/43 |
| 2014/0211833 | A1* | 7/2014 | Schoeneich | H04L 25/0232 375/346 |
| 2018/0198580 | A1* | 7/2018 | Nammi | H04L 27/0012 |
| 2019/0049594 | A1* | 2/2019 | Yoshino | G01S 19/44 |
| 2019/0356462 | A1* | 11/2019 | Bendlin | H04L 5/001 |
| 2020/0116248 | A1* | 4/2020 | Yamaguchi | G03G 21/1647 |
| 2020/0127801 | A1* | 4/2020 | Sengupta | H04L 27/262 |
| 2021/0091984 | A1* | 3/2021 | Kuchi | H03H 17/02 |
| 2021/0119751 | A1* | 4/2021 | Mundarath | H04L 1/0045 |
| 2021/0125437 | A1* | 4/2021 | Lee | G07C 9/00309 |
| 2022/0029870 | A1* | 1/2022 | Lu | H04J 13/0062 |
| 2022/0393922 | A1* | 12/2022 | Geng | H04L 27/2607 |
| 2023/0007520 | A1* | 1/2023 | Yao | H04L 43/20 |
| 2023/0179450 | A1* | 6/2023 | Golebiowski | H04L 47/27 370/230 |
| 2023/0327916 | A1* | 10/2023 | Upalekar | H04L 1/0061 |
| 2023/0327917 | A1* | 10/2023 | Upalekar | H04J 13/18 |
| 2023/0327918 | A1* | 10/2023 | Upalekar | H04L 25/0232 |
| 2024/0067822 | A1* | 2/2024 | Tanabe | C08G 73/14 |
| 2024/0259246 | A1* | 8/2024 | Hamidi-Sepehr | H04L 27/26522 |
| 2024/0275531 | A1* | 8/2024 | Thasari | H04L 1/1825 |
| 2024/0283876 | A1* | 8/2024 | Tsuchiya | H04N 1/00315 |
| 2024/0320790 | A1* | 9/2024 | Iwahana | G06T 5/00 |
| 2025/0023759 | A1* | 1/2025 | Xu | H04L 1/00 |
| 2025/0088391 | A1* | 3/2025 | Thasari | H04L 5/0091 |

FOREIGN PATENT DOCUMENTS

| | | | | |
|---|---|---|---|---|
| CN | 1146163 | C * | 4/2004 | H04J 13/0055 |
| CN | 101083515 | A * | 12/2007 | |
| CN | 101364966 | A * | 2/2009 | |
| CN | 102844991 | A * | 12/2012 | H04J 13/18 |
| CN | 104426820 | A * | 3/2015 | |
| CN | 107979548 | A * | 5/2018 | H04L 25/0204 |
| CN | 107979556 | A * | 5/2018 | H04L 25/0204 |
| CN | 104426820 | B * | 6/2018 | |
| CN | 110855595 | A * | 2/2020 | H04L 27/0014 |
| CN | 111082907 | A * | 4/2020 | G01S 5/0036 |
| CN | 111245750 | A * | 6/2020 | H04L 25/0202 |
| CN | 106063163 | B * | 7/2020 | H04B 17/318 |
| CN | 112165370 | A * | 1/2021 | H04L 1/0009 |
| CN | 113852381 | A * | 12/2021 | |
| CN | 114257481 | A * | 3/2022 | H04L 27/0014 |
| CN | 114338306 | A * | 4/2022 | |
| CN | 114500184 | A * | 5/2022 | |
| CN | 112165370 | B * | 7/2022 | H04L 1/0009 |
| CN | 114697169 | A * | 7/2022 | H04L 27/0014 |
| CN | 114500184 | B * | 8/2023 | |
| CN | 114338306 | B * | 5/2024 | |
| CN | 119210966 | A * | 12/2024 | |
| DE | 2723083 | A * | 7/1978 | B60R 25/1004 |
| EP | 2723083 | A2 * | 4/2014 | G06T 9/00 |
| EP | 3188392 | A1 * | 7/2017 | H04L 1/02 |
| EP | 3614608 | A1 * | 2/2020 | H04B 17/327 |
| EP | 3657871 | A1 * | 5/2020 | H04L 1/00 |
| EP | 3790311 | A1 * | 3/2021 | H04L 41/00 |
| EP | 3790311 | B1 * | 6/2022 | H04L 41/00 |
| FR | 2723083 | A1 * | 2/1996 | C04B 35/571 |
| JP | 2002129828 | A * | 5/2002 | E05D 15/26 |
| JP | 2005006343 | A * | 1/2005 | H04J 13/0022 |
| JP | 2005006346 | A * | 1/2005 | H04J 13/0022 |
| JP | 3657871 | B2 * | 6/2005 | E05D 15/26 |
| JP | 4150867 | B2 * | 9/2008 | C08J 5/2237 |
| JP | 5918680 | B2 * | 5/2016 | H04L 1/0026 |
| JP | 2020064111 | A * | 4/2020 | F16G 1/20 |
| JP | 2008514076 | A * | 12/2020 | |
| JP | 2019520728 | A * | 12/2020 | H04W 52/36 |
| JP | 2023028935 | A * | 3/2023 | |
| JP | 2024103265 | A * | 8/2024 | |
| JP | 2024118047 | A * | 8/2024 | H04N 1/00315 |
| JP | 2024118048 | A * | 8/2024 | |
| JP | 2024136868 | A * | 10/2024 | B60R 1/26 |
| KR | 20060040014 | A * | 5/2006 | H04H 20/02 |
| KR | 20140112905 | A * | 3/2013 | H04B 7/24 |
| RU | 2723083 | C1 * | 6/2020 | H04L 5/0007 |
| WO | WO-9959216 | A1 * | 11/1999 | C08J 5/2237 |
| WO | WO-0161950 | A1 * | 8/2001 | H04L 25/0224 |
| WO | WO-0243271 | A2 * | 5/2002 | H04B 7/005 |
| WO | WO-2006124810 | A2 * | 11/2006 | H04B 1/69 |
| WO | WO-2010114167 | A1 * | 10/2010 | H04L 25/022 |
| WO | WO-2011073915 | A2 * | 6/2011 | H04L 25/0212 |
| WO | WO-2011083876 | A1 * | 7/2011 | H04L 25/0204 |
| WO | WO-2014054344 | A1 * | 4/2014 | H04L 1/0026 |
| WO | WO-2015131314 | A1 * | 9/2015 | H04B 1/7113 |
| WO | WO-2016150094 | A1 * | 9/2016 | H04L 25/02 |
| WO | WO-2017138502 | A1 * | 8/2017 | G01C 21/16 |
| WO | WO-2017197075 | A1 * | 11/2017 | H04L 5/0005 |
| WO | WO-2018082045 | A1 * | 5/2018 | H04L 5/0007 |
| WO | WO-2018132944 | A1 * | 7/2018 | H04B 7/0456 |
| WO | WO-2018135495 | A1 * | 7/2018 | B32B 1/00 |
| WO | WO-2019047553 | A1 * | 3/2019 | H04L 1/00 |
| WO | WO-2019084397 | A1 * | 5/2019 | C08G 77/08 |
| WO | WO-2019229774 | A1 * | 12/2019 | H04B 1/1027 |
| WO | WO-2020001171 | A1 * | 1/2020 | H04L 41/00 |
| WO | WO-2020033373 | A1 * | 2/2020 | H04L 43/0817 |
| WO | WO-2020037257 | A1 * | 2/2020 | H04L 5/0053 |
| WO | WO-2020064111 | A1 * | 4/2020 | |
| WO | WO-2020147726 | A1 * | 7/2020 | H04B 17/364 |
| WO | WO-2021165729 | A1 * | 8/2021 | H04L 27/2602 |
| WO | WO-2021228599 | A1 * | 11/2021 | H04L 25/0224 |
| WO | WO-2022097547 | A1 * | 5/2022 | C08G 73/10 |
| WO | WO-2022236969 | A1 * | 11/2022 | H04L 25/03159 |
| WO | WO-2023028935 | A1 * | 3/2023 | H04L 1/08 |
| WO | WO-2024103265 | A1 * | 5/2024 | |
| WO | WO-2024118047 | A1 * | 6/2024 | H04L 12/12 |
| WO | WO-2024118048 | A1 * | 6/2024 | H04L 1/1671 |
| WO | WO-2024136868 | A1 * | 6/2024 | H04B 17/346 |
| WO | WO-2024158394 | A1 * | 8/2024 | H04B 17/336 |
| WO | WO-2025014492 | A1 * | 1/2025 | |

\* cited by examiner

METHOD, APPARATUS, AND COMPUTER READABLE MEDIUM

RELATED APPLICATIONS

The present application is a National Phase of International Application No. PCT/US2022/053861 filed Dec. 22, 2022.

FIELD

The present application relates to a method of determining a robust signal to noise ratio (SNR) that avoids SNR saturation at higher operating signal levels, and an apparatus for determining the robust SNR that avoids SNR saturation at higher operating signal levels.

BACKGROUND

In a wireless communications system, user equipment (UE) communicates with a network node (e.g., a base station, or the like) to transmit data on one or more uplink channels, and to receive data on one or more downlink channels. The UE sends data and signaling to the network node on one or more uplink channels. For example, the data and signaling sent from the UE to the network node is sent on a Physical Uplink Shared Channel (PUSCH).

SUMMARY

In some approaches, the processing of signals for the Physical Uplink Shared Channel (PUSCH)—Cyclic Prefix_Orthogonal Frequency Division Multiplexing (CP_OFDM) involves the removal of the demodulation reference signal (DMRS) base sequence, removal of Orthogonal cover code (OCC) and estimation of a timing offset followed by compensation of the timing offset. In other words, the compensation of the timing offset in some approaches is performed on a signal that has had removal of the OCC sequence. As the OCC removal of some approaches happens before compensation of any possible timing offsets, it results in erroneous least squares channel estimates (LSEs). As a result, by having erroneous LSEs in some approaches, simulation and field deployment have observed that the estimated SNR saturates at a higher operating SNR thereby underrating the user equipment's (USE's) capability to handle advanced scheduling configuration, and resulting in an SNR that is not robust.

One or more embodiments of the present disclosure utilize a two-step OCC removal, and timing compensation performed on a least squares estimate of a channel that add robustness to the estimated SNR. For example, one or more embodiments of the present disclosure disclose determining the least squares channel estimate of the channel, generating a first signal by removing a first OCC sequence from the least squares channel estimate, determining at least an estimated timing offset of the first signal, generating a second signal with an adjusted timing by adjusting a first timing of the least squares channel estimate based on at least the estimated timing offset, generating a third signal by removing a second OCC sequence from the second signal, determining a channel estimate of the channel, determining a first noise power of a first received signal, determining a first signal power of the first received signal, and determining a SNR of the first received signal. In some embodiments, the channel is configured to receive a first received signal, the first received signal including a DMRS symbol sequence, a number of DMRS symbols, and a number of subcarriers.

Thus, one or more embodiments of the present disclosure reduces the likelihood of saturated SNR results, thereby significantly enhancing the robustness of the estimated SNR at higher operating SNRs compared to other approaches. In some embodiments, by significantly enhancing the robustness of the estimated SNR results in better scheduling for the UE than other approaches.

An aspect of this description relates to a method. In some embodiments, the method includes determining, by a processor of a receiver, a least squares channel estimate of a channel, the channel being configured to receive a first received signal, the first received signal including a demodulation reference signal (DMRS) symbol sequence, a number of DMRS symbols, and a number of subcarriers. In some embodiments, the method further includes removing, by the processor, a first Orthogonal cover code (OCC) sequence from the least squares channel estimate, thereby generating a first signal. In some embodiments, the method further includes determining, by the processor, at least an estimated timing offset of the first signal. In some embodiments, the method further includes adjusting, by the processor, a first timing of the least squares channel estimate based on at least the estimated timing offset, thereby generating a second signal with an adjusted timing. In some embodiments, the method further includes removing, by the processor, a second OCC sequence from the second signal, thereby generating a third signal. In some embodiments, the method further includes determining, by the processor, a channel estimate of the channel based on the third signal. In some embodiments, the method further includes determining, by the processor, a first noise power of the first received signal based on at least the channel estimate, the first received signal or the DMRS symbol sequence. In some embodiments, the method further includes determining, by the processor, a first signal power of the first received signal based on at least the channel estimate. In some embodiments, the method further includes determining, by the processor, a signal to noise ratio of the first received signal based on the first noise power and the first signal power. In some embodiments, the method further includes adjusting a data rate of the channel based on the SNR. In some embodiments, the method further includes transmitting, by a transmitter, an output signal based on an adjusted data rate of the channel based on the SNR.

Another aspect of this description relates to an apparatus that includes a memory having non-transitory instructions stored therein, a transceiver coupled to the memory, and a processor coupled to the memory, and being configured to execute the non-transitory instructions, thereby causing the apparatus to determine a least squares channel estimate of a channel, the channel being configured to receive a first received signal, the first received signal including a demodulation reference signal (DMRS) symbol sequence, a number of DMRS symbols, and a number of subcarriers. In some embodiments, the processor is configured to execute the non-transitory instructions, thereby further causing the apparatus to remove a first Orthogonal cover code (OCC) sequence from the least squares channel estimate, thereby generating a first signal. In some embodiments, the processor is configured to execute the non-transitory instructions, thereby further causing the apparatus to determine at least an estimated timing offset of the first signal. In some embodiments, the processor is configured to execute the non-transitory instructions, thereby further causing the apparatus to adjust a first timing of the least squares channel estimate based on at least the estimated timing offset, thereby generating a second signal with an adjusted timing. In some embodiments, the processor is configured to execute the non-transitory instructions, thereby further causing the apparatus to remove a second OCC sequence from the second signal, thereby generating a third signal. In some embodiments, the processor is configured to execute the non-transitory instructions, thereby further causing the apparatus to determine a channel estimate of the channel based on the third signal. In some embodiments, the processor is configured to execute the non-transitory instructions, thereby further causing the apparatus to determine a first noise power of the first received signal based on at least the channel estimate, the first received signal or the DMRS symbol sequence. In some embodiments, the processor is configured to execute the non-transitory instructions, thereby further causing the apparatus to determine a first signal power of the first received signal based on at least the channel estimate. In some embodiments, the processor is configured to execute the non-transitory instructions, thereby further causing the apparatus to determine a signal to noise ratio (SNR) of the first received signal based on the first noise power and the first signal power. In some embodiments, the processor is configured to execute the non-transitory instructions, thereby further causing the apparatus to determine an adjusted data rate of the channel based on the SNR. In some embodiments, the transceiver is configured to send a signal based on the adjusted data rate of the channel, the signal instructing a device to adjust a data rate to the adjusted data rate.

Still another aspect of this description relates to a computer-readable medium. In some embodiments, the computer-readable medium includes instructions executable by a controller of a system to cause the system to perform operations including determining a least squares channel estimate of a channel, the channel being configured to receive a first received signal, the first received signal including a demodulation reference signal (DMRS) symbol sequence, a number of DMRS symbols, and a number of subcarriers. In some embodiments, the computer-readable medium includes instructions executable by the controller of the system to further cause the system to perform operations including removing a first Orthogonal cover code (OCC) sequence from the least squares channel estimate, thereby generating a first signal. In some embodiments, the computer-readable medium includes instructions executable by the controller of the system to further cause the system to perform operations including determining at least an estimated timing offset of the first signal. In some embodiments, the computer-readable medium includes instructions executable by the controller of the system to further cause the system to perform operations including adjusting a first timing of the least squares channel estimate based on at least the estimated timing offset, thereby generating a second signal with an adjusted timing. In some embodiments, the computer-readable medium includes instructions executable by the controller of the system to further cause the system to perform operations including removing a second OCC sequence from the second signal, thereby generating a third signal. In some embodiments, the computer-readable medium includes instructions executable by the controller of the system to further cause the system to perform operations including determining a channel estimate of the channel based on the third signal. In some embodiments, the computer-readable medium includes instructions executable by the controller of the system to further cause the system to perform operations including determining a first noise power of the first received signal based on at least the channel estimate, the first received signal or the DMRS symbol sequence. In some embodiments, the computer-readable medium includes instructions executable by the controller of the system to further cause the system to perform operations including determining a first signal power of the first received signal based on at least the channel estimate. In some embodiments, the computer-readable medium includes instructions executable by the controller of the system to further cause the system to perform operations including determining a signal to noise ratio (SNR) of the first received signal based on the first noise power and the first signal power. In some embodiments, the computer-readable medium includes instructions executable by the controller of the system to further cause the system to perform operations including determining an adjusted data rate of the channel based on the SNR. In some embodiments, the computer-readable medium includes instructions executable by the controller of the system to further cause the system to perform operations including sending a signal based on the adjusted data rate of the channel, the signal instructing a device to adjust a data rate to the adjusted data rate.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
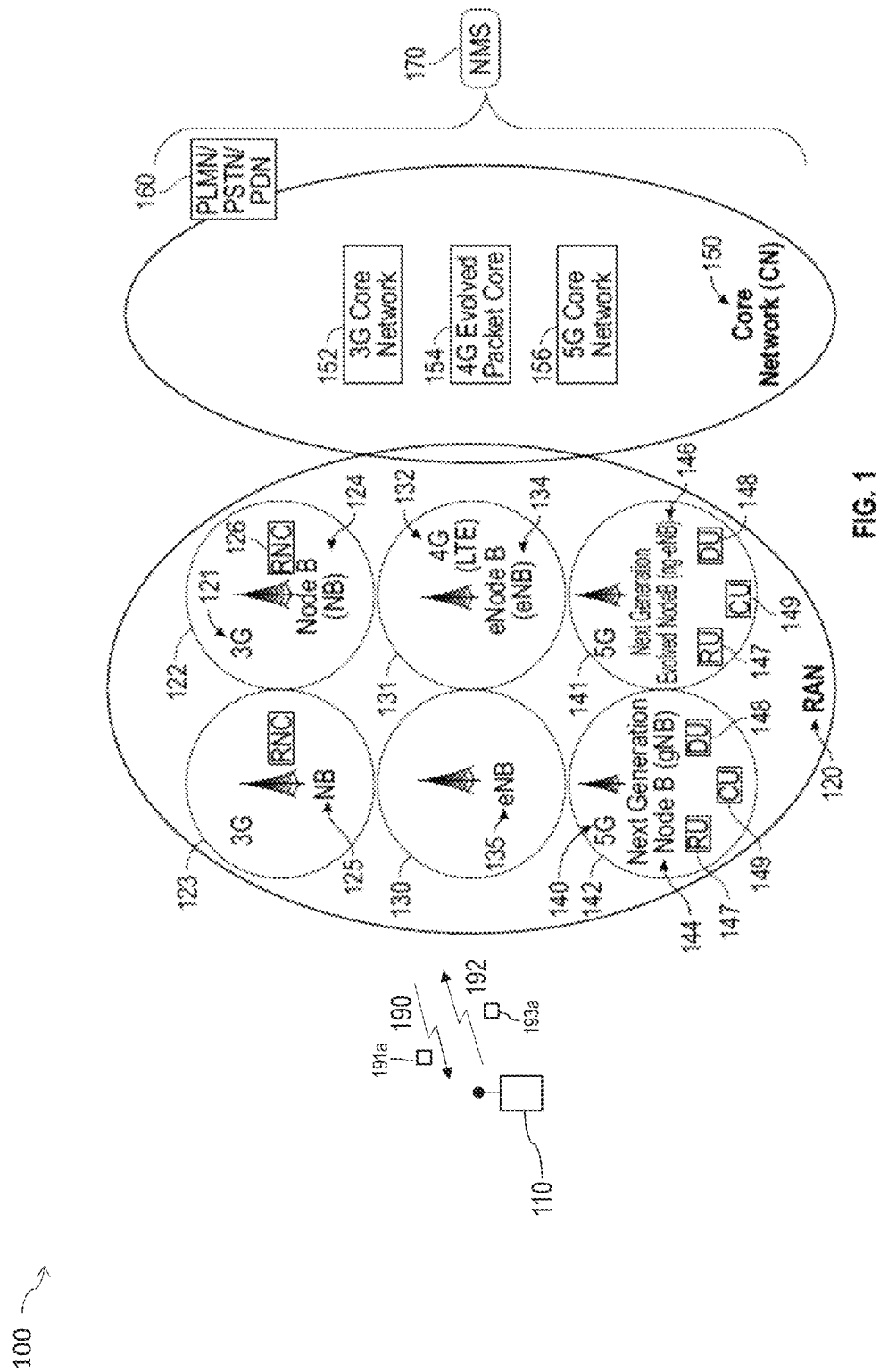
FIG. 1 is a block diagram of a mobile network, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Terms "system" and "network" in embodiments of this application are used interchangeably. "At least one" means one or more, and "a plurality of" means two or more. The term "and/or" describes an association relationship between associated objects and indicates that three relationships exist. For example, A and/or B indicate the following cases: Only A exists, both A and B exist, and only B exists, where A and B is singular or plural. The character "/" generally indicates an "or" relationship between the associated objects. "At least one of" or a similar expression thereof means any combination of items, including any combination of singular items (pieces) or plural items (pieces). For example, "at least one of A, B, and C" includes A, B, C, AB, AC, BC, or ABC, and ""at least one of A, B, or C" includes A, B, C, A and B, A and C, B and C, or A and B and C.

FIG. 1 is a block diagram of a mobile network 100, in accordance with some embodiments.

In FIG. 1, a mobile telecommunication network couples User Equipment (UE) 110 through Radio Access Network (RAN) 120 to a Core Network (CN) 150. RAN 120 connects individual devices, such as UE 110 to other parts of a network, e.g., CN 150, through radio connections. RAN 120 is responsible for managing radio resources, including strategies and algorithms for controlling power, channel allocation and data rate.

RANs 120 have evolved over time, from 3G to 5G. For example, RANs 120 are implemented in various configurations, such as Global System for Mobile Communications (GSM) RAN (GRAN), GSM Enhanced Data Rates for GSM Evolution (EDGE) RAN (GERAN), Universal Mobile Telecommunications Service (UMTS) Terrestrial RAN (UTRAN), Evolved UMTS Terrestrial RAN (E-UTRAN), Centralized/Cloud RAN (CRAN), Virtualized RAN (VRAN), and Open RAN (ORAN).

In some embodiments, RAN 120 includes one or more of 3G network 121, 4G network 132 or 5G network 140.

In a 3G network 121, RAN 120 includes the base station for Cell Sites 122, 123, which is called a Node B (NB) 124, 125, and a Radio Network Controller (RNC) 126. RNC 126 controls and manages the radio transceivers in Node Bs 124, 125, as well as manages operational functions, such as handoffs, and the radio channels. The RNC 126 handles communication with the 3G Core Network 152.

In a 4G network 132, Cell Sites 130, 131 are implemented using Evolved Node Bs (eNodeBs or eNBs) 134, 135 for the radio base station. The eNodeBs 134, 135 are able to perform the radio access functions that are equivalent to the combined work that Node Bs 124, 125 and RNC perform in 3G and connect to the Evolved Packet Core 154.

In a 5G network 140, Cell Sites 141, 142 are implemented using one of two types of RANs: Next Generation Node B (gNodeB) 144 and Next Generation Evolved Node B (ng-eNB) 146. The ng-eNB 146 is an enhanced version of 4G eNodeB and connects 5G UE 110 to the 5G Core Network (5GC) 156 using 4G LTE air interface. The gNB 144 allows 5G UE 110 to connect with a 5GC 156 using 5G NR air interface. The gNBs 144 and ng-eNBs 146 are interconnected by means of the Xn interface. The gNBs 144 and ng-eNBs 146 are also connected by means of the NG interfaces to the 5GC 156.

In 5G, for example, an Open RAN environment is able to be implemented wherein the RAN 120, provided by the gNBs 144 and ng-eNBs 146, is separated into the Radio Unit (RU) 147, the Distributed Unit (DU) 148, and the Centralized Unit (CU) 149. The RU 147 is where the radio frequency signals are transmitted, received, amplified, and digitized. The RU 147 is located near or integrated into, the antenna. The DU 148 and CU 149 are the computation parts of the base station, sending the digitized radio signal into the network. The DU 148 is physically located at or near the RU 147 whereas the CU 149 is often located near the Core Network 150. The different interfaces associated with the Open RAN 120 include the Fronthaul (FH) that lies between the RU 147 and the DU 148, the Midhaul (MH) that lies between the DU 148 and the CU 149, and the Backhaul (BH) that lies between the CU 149 and the Core Network 150.

Core Network (CN) 150 connects RAN 120 to networks 160, such as a Public Landline Mobile Network (PLMN), a Public Switched Telephone Network (PSTN) and a Packet Data Network (PDN). CN 150 provides high-level traffic aggregation, routing, call control/switching, user authentication and charging. The 3G CN 152 involves two different domains: circuit switched elements and packet switched elements. The 4G Evolved Packet Core (EPC) 154 includes four main network elements: the Serving Gateway (S-GW), the packet data network (PDN) Gateway (P-GW), the mobility management entity (MME), and the Home Subscriber Server (HSS). The S-GW routes and forwards data packets from the UE and acts as the mobility anchor during inter-eNodeB handovers. The P-GW acts as an ingress and egress point to the EPC from a PDN (Packet Data Network) such as the Internet. The MME manages UE access network and mobility, as well as establishing the bearer path for User Equipment (UE). The MME is also concerned with the bearer activation/deactivation process. The HSS is the master database for a given subscriber, acting as a central repository of information for network nodes. Subscriber related information held by the HSS includes user identification, security, location, and subscription profile. The EPC is connected to the external networks, which includes the IP Multimedia Core Network Subsystem (IMS). 5GC 156 supports new network functions (NFs) associated with the packet core and user data management domains. 5GC 156 provides a decomposed network architecture with the introduction of a service-based interface (SBI), and control plane and user plane separation (CUPS). 5GC decomposes the 4G MME into an Access and Mobility Management Function (AMF) and a Session Management Function (SMF). The AMF receives connection and session related information from the UE, but is responsible for handling connection and mobility management tasks. Messages related to session management are forwarded to the SMF.

The mobile network 100 is managed by the network management system (NMS) 170, which provides several network management functionalities. According to at least one embodiment, the NMS 170 provides a customer care representative the real-time network experiences of one or more customers. For example, in some embodiments, the NMS 170 provides the customer care representative FM information, PM information, cell site coverage information, cell site information and NW data of the customer.

There is a maximum number of users that may be accommodated by the mobile network 100 before either the quality or performance of the mobile network 100 is negatively impacted. The carrying capacity of a mobile network 100 is the total amount of data or voice traffic that a cell site, e.g., Cell Sites 122, 123, 130, 131, 141, 142, of the mobile network 100 is able to transfer to and from customers. Wireless data are carried by modulating radio waves. The quantity of waves (or amount of spectrum) a wireless system is allowed to modulate each second is called its bandwidth, and is measured in hertz (Hz). In some embodiments, a signal with a higher bandwidth (i.e., more Hz) can carry more data per second than a signal of lower bandwidth (i.e., less Hz). The total amount of data that a cell site transfers over a given period of time relates to the rate at which Cell Sites 122, 123, 130, 131, 141, 142 transfer data bytes. In some embodiments, a faster cell site will transfer more bytes than a slower cell site. Rates of data transfer are measured in terms of bits per second (bps).

As the number of users increases, so does the amount of traffic that occurs in a given period of time. As a consequence, Cell Sites 122, 123, 130, 131, 141, 142 progressively become more and more congested. As a result, the channels of Cell Sites 122, 123, 130, 131, 141, 142 will continue to diminish.

According to at least one embodiment, the UE 110 can adjust a data rate of an uplink signal sent, by the UE 110, to the RAN 120.

One or more embodiments are applicable to PUSCH DMRS signal generation and mapping to physical resources, as described in the $3^{rd}$ Generation Partnership Project (3GPP), at the following sections:

Technical Specification (TS) 38.211, at
    6.4.1.1 Demodulation reference signal for PUSCH.

Figure 2:
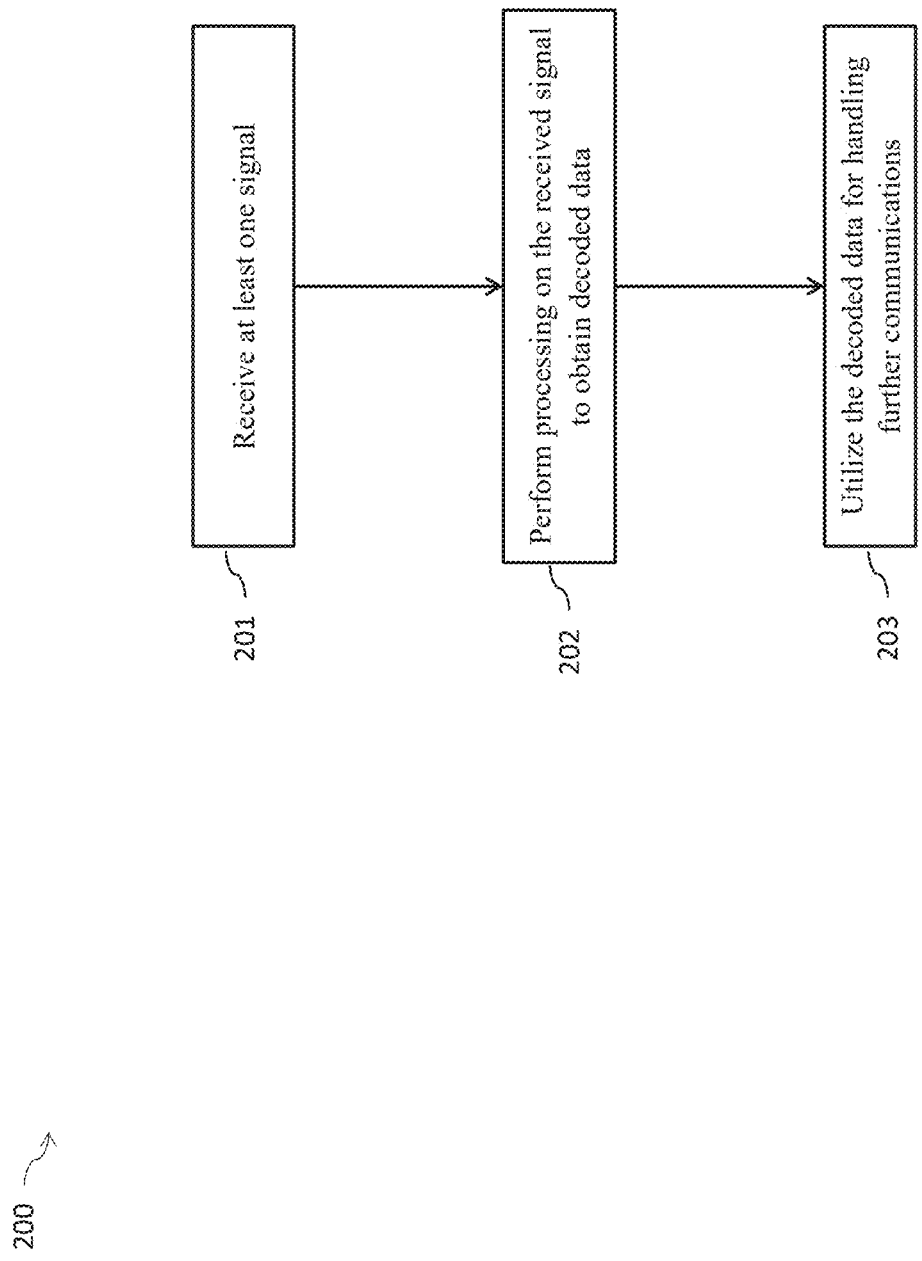
FIG. 2 is a flowchart of a method of operating a system, in accordance with some embodiments.

FIG. 2 is a flowchart of a method 200 of operating a system, in accordance with some embodiments.

In some embodiments, method 200 includes a series of steps or operations (e.g., 201-203) performed by system 100 or 400. In some embodiments, method 300 is a method of estimating a robust signal to noise (SNR) ratio that avoids SNR saturation at higher operating signal levels.

Figure 4:
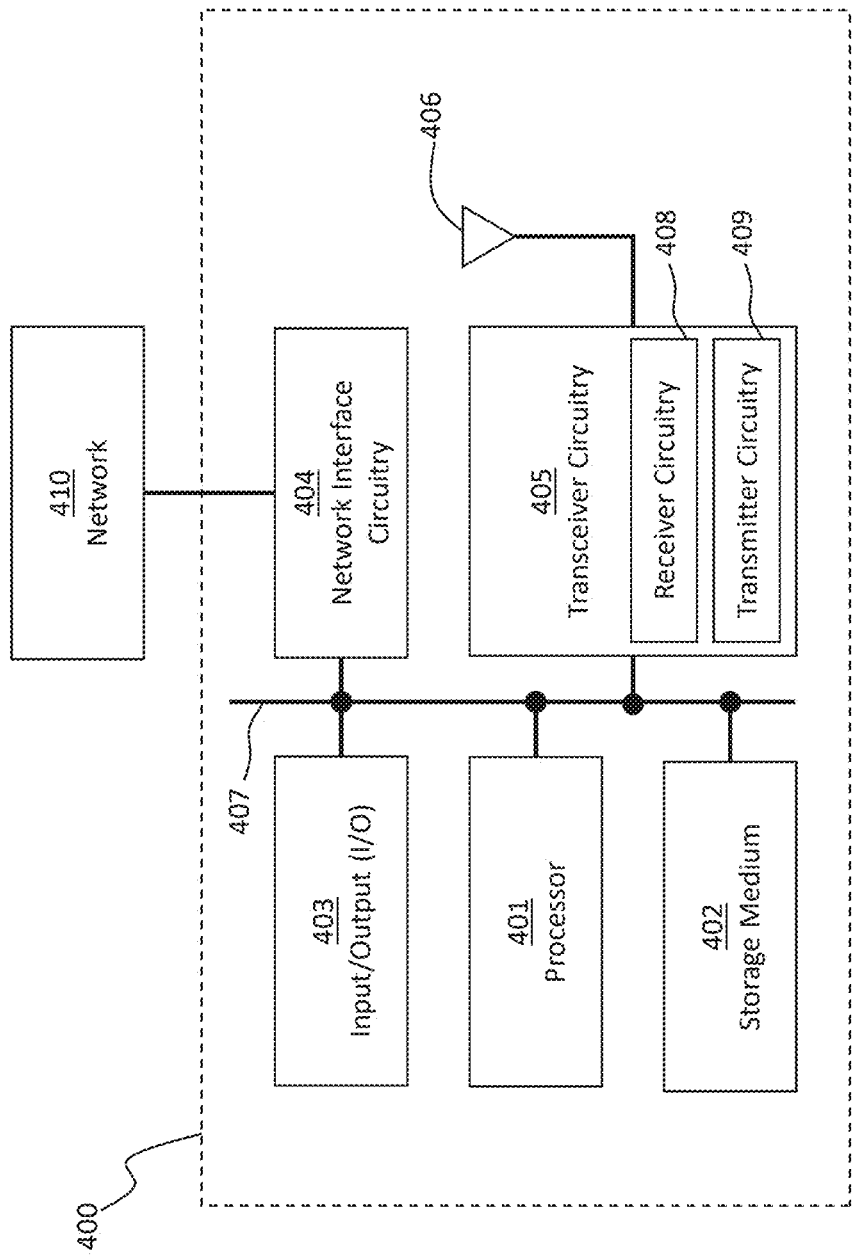
FIG. 4 is a schematic view of a system, in accordance with some embodiments.

In some embodiments, FIG. 2 is a flowchart of a method 200 of operating system 100 of FIG. 1 or system 400 of FIG. 4, and similar detailed description is therefore omitted. It is understood that additional operations may be performed before, during, and/or after the method 200 depicted in FIG. 2, and that some other operations may only be briefly described herein. In some embodiments, other order of operations of method 200 is within the scope of the present disclosure. In some embodiments, one or more operations of method 200 are not performed.

Method 200 includes exemplary operations, but the operations are not necessarily performed in the order shown. Operations may be added, replaced, changed order, and/or eliminated as appropriate, in accordance with the spirit and scope of disclosed embodiments. It is understood that method 200 utilizes features of one or more of system 100 or 400 or method 300.

In some embodiments, one or more or all operations of method 200 are performed by at least one processor 401, a user equipment corresponding to the UE 110, and/or a network device corresponding to a base station or a RAN 120.

At operation 201 of method 200, a user equipment (e.g., UE 110) receives at least one signal 190 from a network device over a channel 191*a*. For example, the received signal is received by an antenna, such as antenna 406 and corresponding receiver circuitry 408 of the user equipment, in accordance with some embodiments. In some embodiments, the user equipment (e.g., UE 110) receives the at least one signal from the network device, such as RAN 120, over a Physical Uplink Shared Channel (PUSCH). Other channel types are within the scope of the present disclosure.

In some embodiments, operation 201 is performed by at least receiver circuitry 408.

At operation 202 of method 200, a processor 401 of the UE 110, which is coupled to the receiver circuitry 408, performs processing on the received signal to obtain decoded data from the network device (e.g., RAN 120). In some embodiments, operation 202 includes one or more of operations 301-311 of FIG. 3.

Figure 3:
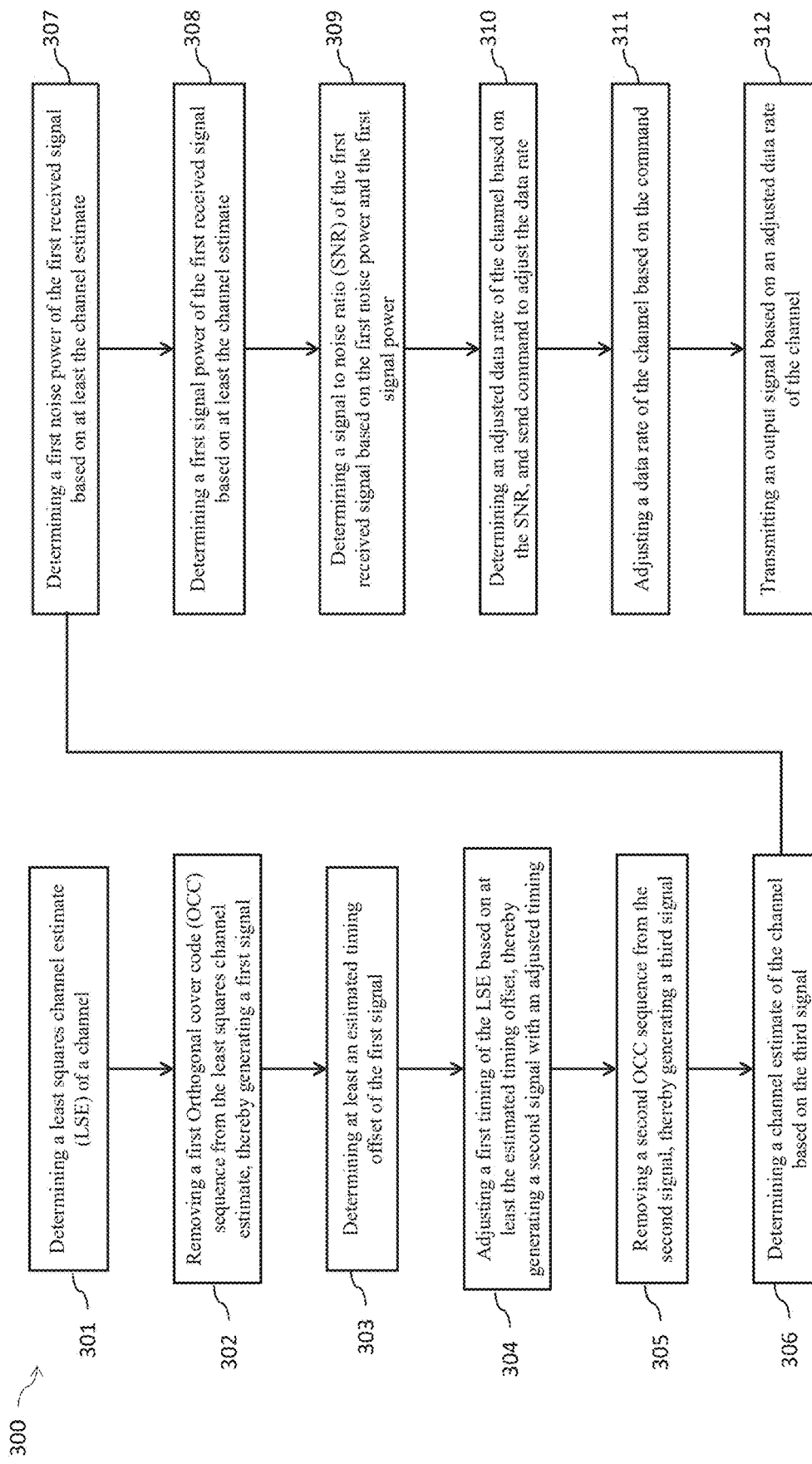
FIG. 3 is a flowchart of a method of operating a system, in accordance with some embodiments.

At operation 203 of method 200, the processor 401 is configured to utilize the decoded data for handling further communications with the network device, for example, as described with respect to one or more of operations 310 or 311 of method 300 (FIG. 3).

In some embodiments, operation 203 includes transmitting an output signal 392 by a transmitter on a channel 193*a*. In some embodiments, the output signal 392 has an adjusted data rate. In some embodiments, operation 203 is performed by at least transmitter circuitry 409.

In some embodiments, operation 203 includes at least one of operation 310, operation 311 or operation 312.

In at least one embodiment, one or more advantages described herein are achievable by the method 200.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

FIG. 3 is a flowchart of a method 300 of operating a system, in accordance with some embodiments.

Method 300 is an embodiment of at least operations 201, 202 or 203 of method 200 of FIG. 2, and similar detailed description is therefore omitted. For example, in some embodiments, method 300 is a method of estimating a robust signal to noise (SNR) ratio that avoids SNR saturation at higher operating signal levels.

In some embodiments, one or more of operations 301-312 is an embodiment of one or more of operations 201-203 of method 200, and similar detailed description is therefore omitted. In some embodiments, at least one of operation 301, 302, 303, 304, 305, 306, 307, 308, 309 or 310 is an embodiment of operation 202 of method 200, and similar detailed description is therefore omitted. In some embodiments, at least one of operation 309 or 310 is an embodiment of operation 203 of method 200, and similar detailed description is therefore omitted.

In some embodiments, method 300 includes a series of steps or operations (e.g., 301-312) performed by system 100 or 400.

In some embodiments, FIG. 3 is a flowchart of a method 300 of operating system 100 of FIG. 1 or system 400 of FIG. 4, and similar detailed description is therefore omitted. It is understood that additional operations may be performed before, during, and/or after the method 300 depicted in FIG. 3, and that some other operations may only be briefly described herein. In some embodiments, other order of operations of method 300 is within the scope of the present disclosure. In some embodiments, one or more operations of method 300 are not performed.

Method 300 includes exemplary operations, but the operations are not necessarily performed in the order shown.

Operations may be added, replaced, changed order, and/or eliminated as appropriate, in accordance with the spirit and scope of disclosed embodiments. It is understood that method 300 utilizes features of one or more of system 100 or 400 or method 200.

In some embodiments, one or more or all operations of method 300 are performed by at least one processor 401, a user equipment corresponding to the UE 110, and/or a network device corresponding to a base station or a RAN 120.

In operation 301 of method 300, a least squares channel estimate $H_{LS}$ of a channel is determined. In some embodiments, the channel of method 300 includes channel 191a or channel 193a. In some embodiments, operation 301 is performed by the processor 401 of system 400.

In some embodiments, the channel is configured to receive a first received signal $Y_{DMRS}$. In some embodiments, the channel is a PUSCH channel, and the first received signal $Y_{DMRS}$ is a signal received over the PUSCH channel. In some embodiments, the first received signal $Y_{DMRS}$ is a Cyclic Prefix (CP)-OFDM waveform or a Discrete Fourier Transform Spread OFDM (DFT-s-OFDM) waveform.

In some embodiments, the first received signal $Y_{DMRS}$ includes a demodulation reference signal (DMRS) symbol sequence $X_{DMRS}$, a number of DMRS symbols l, and a number of subcarriers k. In some embodiments, the DMRS symbol sequence $X_{DMRS}$ includes a Zadoff-Chu sequence in Discrete Fourier Transform (DFT) Orthogonal Frequency Multiplexing (OFDM). In some embodiments, Zadoff-Chu sequence includes orthogonal sequences that are generated with different cyclic shifts for a group number and sequence number.

In some embodiments, operation 301 includes determining the least squares channel estimate $H_{LS}(k, l)$ of the channel by Equation 1, as follows:

$$H_{LS}(k, l) = Y_{DMRS}(k, l) * conj(x_{DMRS}(k, l), \quad \text{(Equation 1)}$$

where k=1, 2, . . . , number of subcarriers; and
l=1, 2, 3, . . . , number of DMRS symbols.

$H_{LS}(k, l)$ is the least squares channel estimate of the channel for index k and index l, k is an integer corresponding to a number of subcarriers, l is an integer corresponding to the number of DMRS symbols, $Y_{DMRS}$ is the first received signal, and $X_{DMRS}$ is the DMRS symbol sequence.

In some embodiments, equation 1 is determined for each subcarrier index value and for each DMRS symbol value. For brevity, the least squares channel estimate $H_{LS}(k, l)$ of the channel is abbreviated as "the least squares channel estimate $H_{LS}$ of the channel."

In operation 302 of method 300, a first Orthogonal cover code (OCC) sequence is removed from the least squares channel estimate $H_{LS}$, thereby generating a first signal $H_{deOCC1}(k, l)$. In some embodiments, the first signal $H_{deOCC1}(k, l)$ corresponds to the least squares channel estimate $H_{LS}$ with the first OCC sequence removed. In some embodiments, operation 302 is performed by processor 401.

In some embodiments, operation 302 includes removing the first OCC sequence from the least squares channel estimate $H_{LS}$, thereby generating the first signal $H_{deOCC1}(k, l)$ by Equation 2 as follows:

$$H_{deOcc1}(k, l) = fn1(H_{LS}(k, l)) \quad \text{(Equation 2)}$$

where k=1, 2, . . . , number of subcarriers; and
l=1, 2, 3, . . . , number of DMRS symbols.

$H_{deOCC1}(k, l)$ is the first signal, and fn1 is a first deOCC function.

In some embodiments, the first deOCC function fn1 is configured to filter pairs of values of a first input vector (e.g., the first signal $H_{deOCC1}(k, l)$) with a configured first OCC code. In some embodiments, the configured first OCC code includes at least one of OCC code [1,1] or [1,-1]. Other expressions for the first configured OCC code is within the scope of the present disclosure. Other equations for the first deOCC function fn1 is within the scope of the present disclosure.

In some embodiments, equation 2 is determined for each subcarrier index value and for each DMRS symbol value. For brevity, the first signal $H_{deOCC1}(k, l)$ is abbreviated as "first signal $H_{deOCC1}$."

In operation 303 of method 300, at least an estimated timing offset Ω of the first signal $H_{deOCC1}$ is determined. In some embodiments, operation 303 corresponds to determining the estimated timing offset Ω of the first signal $H_{deOCC1}$ with the first OCC sequence removed.

In some embodiments, operation 303 is performed by processor 401.

In some embodiments, operation 303 includes determining at least the estimated timing offset Ω of the first signal $H_{deOCC1}$ by Equation 3 as follows:

$$\Omega = \tan^{-1}\left(\frac{imag(TA_{metric})}{real(TA_{metric})}\right) \quad \text{(Equation 3)}$$

Ω is the estimated timing offset of the first signal $H_{deOCC1}$, and $TA_{metric}$ is a timing advance. In some embodiments, Ω is expressed in radians. In some embodiments the timing advance $TA_{metric}$ is the timing advance or the time difference between the expected time of arrival and actual time of arrival of signals at the gNB receiver antenna. In some embodiments the timing advance $TA_{metric}$ is expressed in microseconds. Other units for the timing advance $TA_{metric}$ is within the scope of the present disclosure.

The timing advance $TA_{metric}$ is determined according to Equation 4. In some embodiments, operation 303 further includes determining the timing advance $TA_{metric}$, by Equation 4 as follows:

$$TA_{metric} = E[H_{deOcc1}(k, l) * cong(H_{deOcc1}(k + u, l))] \quad \text{(Equation 4)}$$

where k=1, 2, . . . , number of subcarriers; and
l=1, 2, 3, . . . , number of DMRS symbols.

$E[H_{deOcc1}(k, l)*conj(H_{deOcc1}(k+u, l))]$ is the expected value of the product of the first signal $H_{deOCC1}$ and the conjugate (e.g., "conj") of a first intermediary value $H_{deOCC1}(k+u, l)$, u is an integer and is a fixed offset, and the first intermediary value $H_{deOCC1}(k+u, l)$ is a version of the first signal $H_{deOCC1}$ shifted by the fixed offset u. In some embodiments, the conjugate multiplication expressed by equation 4 is between an estimated channel (e.g., $E[H_{deOCC1}(k, l)]$) on a given sub-carrier (e.g., k) and an estimated channel (e.g., $E[H_{deOCC1}(k+u, l)]$) of another sub-carrier (e.g., k+u) that is u subcarriers away.

In some embodiments, equations 3 and 4 are determined for each subcarrier index value and for each DMRS symbol value.

In operation 304 of method 300, a first timing of the least squares channel estimate $H_{LS}$ is adjusted based on at least the estimated timing offset $\Omega$, thereby generating a second signal $EstH_{LS}(k, l)$. In some embodiments, the second signal $EstH_{LS}(k, l)$ has an adjusted timing $$e^{-\frac{j\Omega}{u*(FFT\_Size)}}.$$

In some embodiments, operation 304 corresponds to compensating for the estimated timing offset $\Omega$ on the least squares channel estimate $H_{LS}$.

In some embodiments, operation 304 is performed by processor 401.

In some embodiments, operation 304 includes adjusting the first timing of the least squares channel estimate $H_{LS}$ based on at least the estimated timing offset $\Omega$, thereby generating the second signal $EstH_{LS}(k, l)$ by Equation 5 as follows:

$$EstH_{LS}(k, l) = H_{LS}(k, l) * e^{-\frac{j\Omega}{u*(FFT\_Size)}} \qquad \text{(Equation 5)}$$

where k=1, 2, . . . , number of subcarriers; and
l=1, 2, 3, . . . , number of DMRS symbols.
$EstH_{LS}(k, l)$ is the second signal, $H_{LS}$ is the least squares channel estimate of the channel, $$e^{-\frac{j\Omega}{u*(FFT\_Size)}}$$

is the adjusted timing of the second signal $EstH_{LS}(k, l)$, and FFT_Size is a size of a fast Fourier transform (FFT).

In some embodiments, the FFT size FFT_Size corresponds to a size of the FFT that is performed on a received time domain signal. In some embodiments, the FFT is used to determine a frequency domain grid of the received time domain signal. In some embodiments, the received time domain signal is the received signal that is received by an antenna, such as antenna 406 and corresponding receiver circuitry 408 of the user equipment, in accordance with some embodiments. In some embodiments, the user equipment (e.g., UE 110) receives the received time domain signal from the network device, such as RAN 120, over a Physical Uplink Shared Channel (PUSCH). Other channel types are within the scope of the present disclosure. In some embodiments, the FFT size FFT_Size ranges from about 512 to about 4096. Other values for the FFT size FFT_Size are within the scope of the present disclosure.

In some embodiments, equation 5 is determined for each subcarrier index value and for each DMRS symbol value. For brevity, the second signal $EstH_{LS}(k, l)$ is abbreviated as "the second signal $EstH_{LS}$."

In operation 305 of method 300, a second OCC sequence is removed from the second signal $EstH_{LS}$, thereby generating a third signal $H_{deOCC2}(k, l)$. In some embodiments, the third signal $H_{deOCC2}(k, l)$ corresponds to the second signal $EstH_{LS}$ with the second OCC sequence removed. In some embodiments, the second OCC sequence is the same as the first OCC sequence. In some embodiments, the second OCC sequence is different from the first OCC sequence.

In some embodiments, operation 305 is performed by processor 401.

In some embodiments, operation 305 includes removing the second OCC sequence from the second signal $EstH_{LS}$, thereby generating the third signal $H_{deOCC2}(k, l)$ by Equation 6 as follows:

$$H_{deOcc2}(k, l) = fn2(EstH_{LS}(k, l)) \qquad \text{(Equation 6)}$$

where k=1, 2, . . . , number of subcarriers; and
l=1, 2, 3, . . . , number of DMRS symbols.
$H_{deOCC2}(k, l)$ is the third signal, and fn2 is a second deOCC function.

In some embodiments, the second deOCC function fn2 is configured to filter pairs of values of a second input vector (e.g., the second signal $EstH_{LS}(k, l)$) with a configured second OCC code. In some embodiments, the second configured OCC code includes at least one of OCC code [1,1] or [1,−1]. Other expressions for the second configured OCC code is within the scope of the present disclosure. Other equations for the second deOCC function fn2 is within the scope of the present disclosure.

In some embodiments, equation 6 is determined for each subcarrier index value and for each DMRS symbol value. For brevity, the third signal $H_{deOCC2}(k, l)$ is abbreviated as "the third signal $H_{deOCC2}$."

In operation 306 of method 300, a channel estimate $H_{EST}(k, l)$ of the channel is determined based on the third signal $H_{deOCC2}$. In some embodiments, operation 306 is performed by processor 401.

In some embodiments, operation 306 includes determining the channel estimate $H_{EST}(k, l)$ of the channel based on the third signal $H_{deOCC2}$ by Equation 7A as follows:

$$H_{Est}(k, l) = fn3(H_{deOcc2}(k, l)) \qquad \text{(Equation 7A)}$$

where k=1, 2, . . . , number of subcarriers; and
l=1, 2, 3, . . . , number of DMRS symbols.
$H_{EST}(k, l)$ is the channel estimate, and fn3 is a channel estimate function.

In some embodiments, the channel estimate function fn3 is expressed by equation 7B as follows:

$$fn3(H_{deOcc2}(k, l)) = \text{mean}(H_{deOcc2}(k, l)) \qquad \text{(Equation 7B)}$$

where k=1, 2, . . . , number of subcarriers; and
l=1, 2, 3, . . . , number of DMRS symbols.
In some embodiments, mean ($H_{deOcc2}(k, l)$) is the mean of the third signal $H_{deOCC2}$, and is equal to the channel estimate function fn3. Other equations for determining the channel estimate function fn3 are within the scope of the present disclosure.

In some embodiments, equation 7A is determined for each subcarrier index value and for each DMRS symbol value. For brevity, the channel estimate $H_{EST}(k, l)$ is abbreviated as "the channel estimate $H_{EST}$."

In operation 307 of method 300, a first noise power NP of the first received signal $Y_{DMRS}$ is determined based on at least one of the channel estimate $H_{EST}$, the first received signal $Y_{DMRS}$ or the DMRS symbol sequence $X_{DMRS}$.

In some embodiments, operation 307 is performed by processor 401.

In some embodiments, operation 307 includes determining the first noise power NP of the first received signal $Y_{DMRS}$ based on Equations 8 and 9 as follows:

$$NP = \sum_{l=1}^{numDMRS} \sum_{k=1}^{numSC} N(k, l) * conj(N(k, l)) \quad \text{(Equation 8)}$$

where k=1, 2, . . . , number of subcarriers; and
l=1, 2, 3, . . . , number of DMRS symbols.

NP is the first noise power of the first received signal $Y_{DMRS}$, N(k, l) is a second intermediary value, and conj(N(k, l)) is the conjugate of the second intermediary value N(k, l).

The second intermediary value N(k, l) is determined according to Equation 9. In some embodiments, operation 307 further includes determining the second intermediary value N(k, l) by Equation 9 as follows:

$$N(k, l) = Y_{DMRS}(k, l) - H_{Est}(k, l) * x_{DMRS}(k) \quad \text{(Equation 9)}$$

where k=1, 2, . . . , number of subcarriers; and
l=1, 2, 3, . . . , number of DMRS symbols.
N(k, l) is the second intermediary value, $Y_{DMRS}(k, l)$ is the first received signal, $X_{DMRS}(k)$ is the DMRS symbol sequence of the kth subcarrier, and $H_{EST}(k, l)$ is the channel estimate of the channel.

In some embodiments, equations 8 and 9 are determined for each subcarrier index value and for each DMRS symbol value. For brevity, the second intermediary value N(k, l) is abbreviated as "the second intermediary value N."

In operation 308 of method 300, a first signal power SP of the first received signal $Y_{DMRS}$ is determined based on at least the channel estimate $H_{EST}$. In some embodiments, operation 308 is performed by processor 401.

In some embodiments, operation 308 includes determining the first signal power SP of the first received signal $Y_{DMRS}$ based on Equation 10 as follows:

$$SP = \sum_{l=1}^{numDMRS} \sum_{k=1}^{numSC} H_{Est}(k, l) * conj(H_{Est}(k, l)) \quad \text{(Equation 10)}$$

where k=1, 2, . . . , number of subcarriers; and
l=1, 2, 3, . . . , number of DMRS symbols.
SP is the first signal power of the first received signal $Y_{DMRS}$, numDMRS corresponds to the number of DMRS symbols I, numSC corresponds to the number of subcarriers k, $H_{EST}(k, l)$ is the channel estimate of the channel, and conj($H_{EST}(k, l)$) is the conjugate of the channel estimate $H_{EST}(k, l)$ of the channel.

In operation 309 of method 300, a signal to noise ratio SNR1 of the first received signal $Y_{DMRS}$ is determined based on the first noise power NP and the first signal power SP. In some embodiments, operation 309 is performed by processor 401.

In some embodiments, operation 309 includes determining the signal to noise ratio (SNR) of the first received signal $Y_{DMRS}$ based on Equation 11 as follows:

$$SNR1 = SP/NP \quad \text{(Equation 11)}$$

SNR1 is the SNR of the first received signal $Y_{DMRS}$, SP is the first signal power of the first received signal $Y_{DMRS}$, and NP is the first noise power of the first received signal $Y_{DMRS}$.

In operation 310 of method 300, an adjusted data rate of the channel is determined based on the SNR, and a command is sent to adjust the data rate. In some embodiments, operation 310 is performed by processor 401 or transceiver 405.

In some embodiments, operation 310 includes determining, by the base station, to adjust the data rate of the channel on the SNR, and sending a command to the UE 110 to adjust the data rate. In some embodiments, if the SNR is greater than an estimated SNR, then in operation 310, the base station determines that the data rate of the channel can be increased in accordance with the upper limit of the channel capacity of the channel based on the Shannon-Hartley channel capacity theorem, and sends a command to the UE 110 to adjust the data rate to the adjusted data rate. For example, in some embodiments, the data rate can be adjusted in increments of 1-2% until the upper limit of the channel capacity based on the Shannon-Hartley channel capacity theorem is reached. Other increments are within the scope of the present disclosure. In some embodiments, if the SNR is less than the estimated SNR, then in operation 310, the base station determines that the data rate of the channel can be decreased to be lower than the upper limit of the channel capacity of the channel based on the Shannon-Hartley channel capacity theorem, and sends the command to the UE 110 to adjust the data rate to the adjusted data rate. For example, in some embodiments, the data rate can be adjusted in decrements of 1-2% until the upper limit of the channel capacity based on the Shannon-Hartley channel capacity theorem is reached. Other decrements are within the scope of the present disclosure.

In operation 311 of method 300, a data rate of the channel is adjusted based on the command. In some embodiments, operation 311 is performed by a processor 401 of the UE 110.

In some embodiments, operation 311 includes the UE 110 receiving the command from the base station to adjust the data rate to the adjusted data rate, and the UE 110 adjusts the data rate of the channel based on the command.

In operation 312 of method 300, an output signal is transmitted based on an adjusted data rate of the channel. In some embodiments, operation 312 includes a transmitter circuitry 409 of the transmitter of the UE 110 transmitting the output signal based on the adjusted data rate of the channel. In some embodiments, operation 312 is performed by transceiver 405.

In some embodiments, operation 312 includes transmitting, by the UE 110, the output signal to the base station based on the adjusted data rate of the channel.

While method 300 is described in operations 310-312 with respect to adjusting the data rate of the channel based on the SNR, method 300 is also applicable to adjusting other parameters of system 100 or 400, in accordance with some embodiments. For example, in some embodiments, a throughput of the channel is determined to be increased or decreased based on the SNR. Other parameters are within the scope of the present disclosure.

In some embodiments, one or more of operations 301-312 are performed by a base station, and one or more of operations are performed by the UE 110. In some embodiments, one or more of operations 301-312 are performed by the UE 110, and one or more of operations are performed by a base station.

In some embodiments, one or more of the operations of methods 200 or 300 is not performed.

By utilizing method 300, one or more elements of system 100 or 400 is configured to achieve the benefits discussed within the present disclosure. For example, as shown in FIG. 3, method 300 utilizes a two-step OCC removal in operations 302 and 305, and further utilizes a timing compensation, in operation 304, that is performed on a least squares estimate of a channel that reduces the likelihood of saturated SNR results, thereby significantly enhancing the robustness of the estimated SNR at higher operating SNRs compared to other approaches. In some embodiments, by significantly enhancing the robustness of the estimated SNR results in better scheduling for the UE than other approaches.

FIG. 4 is a block diagram of an example hardware configuration of equipment 400 in a communications system, in accordance with some embodiments.

The equipment 400 is configurable to operate as user equipment 110 or a network device (e.g., base station), as described herein. The equipment 400 comprises a hardware processor 401, a non-transitory, computer-readable storage medium 402, an input/output (I/O) interface 403, network interface circuitry 404, transceiver circuitry 405 with at least one antenna 406, and a bus 407 which couples the processor 401, the storage medium 402, the I/O interface 403, the network interface circuitry 404, and the transceiver circuitry 405 together. In equipment where wireless communication is not configured, the transceiver circuitry 405 and the associated antenna 406 are omitted.

The processor 401 is configured to execute non-transitory computer program codes encoded in the storage medium 402 in order to cause the equipment 400 to perform a portion or all of the described processes and/or methods. In one or more embodiments, the processor 401 comprises a central processing unit (CPU), a multi-processor, a distributed processing system, an application specific integrated circuit (ASIC), and/or a suitable processing unit.

The storage medium 402, amongst other things, is encoded with, i.e., stores, non-transitory computer program codes, i.e., a set of executable non-transitory instructions to be executed by the processor 401, such as one or more algorithms, programs, applications for a system, component, equipment, and/or module, as described with respect to one or more of FIGS. 1-3. Execution of the sets of non-transitory instructions by hardware processor 401 implements a portion or all of the processes and/or methods described herein in accordance with one or more embodiments (hereinafter, the noted processes and/or methods). In one or more embodiments, the storage medium 402 comprises an electronic, magnetic, optical, electromagnetic, infrared, and/or a semiconductor system (or apparatus or device). For example, the storage medium 402 includes a semiconductor or solid-state memory, a magnetic tape, a removable computer diskette, a random access memory (RAM), a read-only memory (ROM), a PROM, an EPROM, a FLASH-EPROM, an EEPROM, a flash memory, another memory chip or cartridge, or another medium from which a computer can read, a rigid magnetic disk, and/or an optical disk. In one or more embodiments using optical disks, the storage medium 402 includes a compact disk-read only memory (CD-ROM), a compact disk-read/write (CD-R/W), and/or a digital video disc (DVD).

The I/O interface 403 includes an input device, an output device and/or a combined input/output device for enabling a user and/or external circuitry/equipment to interact with equipment 400. An input device comprises, for example, a keyboard, keypad, mouse, trackball, trackpad, touchscreen, and/or cursor direction keys for communicating information and commands to the processor 401. An output device comprises, for example, a display, a printer, a voice synthesizer, etc. for communicating information to a user.

The network interface circuitry 404 is coupled to a network 410 so that the processor 401 and storage medium 402 are capable of connecting to other equipment via the network 410. The network interface circuitry 404 includes wireless network interfaces such as OFDMA, CDMA, BLUETOOTH, WIFI, WIMAX, GPRS, WCDMA, LTE, 2G, 3G, 3.5G, 5G, 6G, or the like; or wired network interfaces such as ETHERNET, USB, IEEE-864, or the like. In one or more embodiments, a portion or all of noted processes and/or methods, is implemented in two or more equipment 400 connected over the network 410.

The transceiver circuitry 405 includes receiver circuitry 408 with an associated decoder, and transmitter circuitry 409 with an associated encoder. The receiver circuitry 408 and the transmitter circuitry 409 are coupled to the at least one antenna 406 to correspondingly receive and transmit data through the at least one antenna 406. In some embodiments, the receiver circuitry 408 and the transmitter circuitry 409 are coupled to the same antenna. In one or more embodiments, the receiver circuitry 408 and the transmitter circuitry 409 are coupled to different antennas. The transceiver circuitry 405 is configured to receive and transmit data, using the at least one antenna 406 and the receiver circuitry 408 and/or transmitter circuitry 409, over wireless communication under control of the processor 401. In some embodiments, at least one of the receiver circuitry 408 or the transmitter circuitry 409 comprises one or more of integrated circuits, power amplifier circuitry, low-noise input amplifier circuitry, passive radio frequency (RF) components, other circuitry for handling RF wireless signals, or the like.

In some embodiments, a portion or all of the described processes and/or methods is implemented as a standalone software application for execution by a processor. In some embodiments, a portion or all of the described processes and/or methods is implemented as a software application that is a part of an additional software application. In some embodiments, a portion or all of the described processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a PROM, an EPROM, a FLASH-EPROM, an EEPROM, a flash memory, another memory chip or cartridge, or another medium from which a computer can read, a memory card, or the like.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be One aspect of this description relates to a method. In some embodiments, the method includes determining, by a processor of a receiver, a least squares channel estimate of a channel, the channel being configured to receive a first received signal, the first received signal including a demodulation reference signal (DMRS) symbol sequence, a number of DMRS symbols, and a number of subcarriers. In some embodiments, the method further includes removing, by the processor, a first Orthogonal cover code (OCC) sequence from the least squares channel estimate, thereby generating a first signal. In some embodiments, the method further includes determining, by the processor, at least an estimated timing offset of the first signal. In some embodiments, the method further includes adjusting, by the processor, a first timing of the least squares channel estimate based on at least the estimated timing offset, thereby generating a second signal with an adjusted timing. In some embodiments, the method further includes removing, by the processor, a second OCC sequence from the second signal, thereby generating a third signal. In some embodiments, the method further includes determining, by the processor, a channel estimate of the channel based on the third signal. In some embodiments, the method further includes determining, by the processor, a first noise power of the first received signal based on at least the channel estimate, the first received signal or the DMRS symbol sequence. In some embodiments, the method further includes determining, by the processor, a first signal power of the first received signal based on at least the channel estimate. In some embodiments, the method further includes determining, by the processor, a signal to noise ratio of the first received signal based on the first noise power and the first signal power. In some embodiments, the method further includes adjusting a data rate of the channel based on the SNR. In some embodiments, the method further includes transmitting, by a transmitter, an output signal based on an adjusted data rate of the channel based on the SNR.

In some embodiments, the determining the least squares channel estimate of the channel includes determining the least squares channel estimate of the channel by Equation 1.

In some embodiments, removing the first OCC sequence from the least squares channel estimate, thereby generating the first signal includes removing the first OCC sequence from the least squares channel estimate, thereby generating the first signal by Equation 2.

In some embodiments, determining at least the estimated timing offset of the first signal includes determining at least the estimated timing offset of the first signal by Equation 3, and a timing advance is determined by Equation 4.

In some embodiments, adjusting the first timing of the least squares channel estimate based on at least the estimated timing offset, thereby generating the second signal with the adjusted timing includes adjusting the first timing of the least squares channel estimate based on at least the estimated timing offset, thereby generating the second signal with the adjusted timing by Equation 5.

In some embodiments, removing the second OCC sequence from the second signal, thereby generating the third signal includes removing the second OCC sequence from the second signal, thereby generating the third signal by Equation 6.

In some embodiments, determining the channel estimate of the channel based on the third signal includes determining the channel estimate of the channel based on the third signal by Equation 7A.

Another aspect of this description relates to an apparatus that includes a memory having non-transitory instructions stored therein, a transceiver coupled to the memory, and a processor coupled to the memory, and being configured to execute the non-transitory instructions, thereby causing the apparatus to determine a least squares channel estimate of a channel, the channel being configured to receive a first received signal, the first received signal including a demodulation reference signal (DMRS) symbol sequence, a number of DMRS symbols, and a number of subcarriers. In some embodiments, the processor is configured to execute the non-transitory instructions, thereby further causing the apparatus to remove a first Orthogonal cover code (OCC) sequence from the least squares channel estimate, thereby generating a first signal. In some embodiments, the processor is configured to execute the non-transitory instructions, thereby further causing the apparatus to determine at least an estimated timing offset of the first signal. In some embodiments, the processor is configured to execute the non-transitory instructions, thereby further causing the apparatus to adjust a first timing of the least squares channel estimate based on at least the estimated timing offset, thereby generating a second signal with an adjusted timing. In some embodiments, the processor is configured to execute the non-transitory instructions, thereby further causing the apparatus to remove a second OCC sequence from the second signal, thereby generating a third signal. In some embodiments, the processor is configured to execute the non-transitory instructions, thereby further causing the apparatus to determine a channel estimate of the channel based on the third signal. In some embodiments, the processor is configured to execute the non-transitory instructions, thereby further causing the apparatus to determine a first noise power of the first received signal based on at least the channel estimate, the first received signal or the DMRS symbol sequence. In some embodiments, the processor is configured to execute the non-transitory instructions, thereby further causing the apparatus to determine a first signal power of the first received signal based on at least the channel estimate. In some embodiments, the processor is configured to execute the non-transitory instructions, thereby further causing the apparatus to determine a signal to noise ratio (SNR) of the first received signal based on the first noise power and the first signal power. In some embodiments, the processor is configured to execute the non-transitory instructions, thereby further causing the apparatus to determine an adjusted data rate of the channel based on the SNR. In some embodiments, the transceiver is configured to send a signal based on the adjusted data rate of the channel, the signal instructing a device to adjust a data rate to the adjusted data rate.

In some embodiments, the non-transitory instructions that cause the apparatus to determine the least squares channel estimate of the channel includes the processor being further configured to cause the apparatus to determine the least squares channel estimate of the channel by Equation 1.

In some embodiments, the non-transitory instructions that cause the apparatus to remove the first OCC sequence from the least squares channel estimate, thereby generating the first signal includes the processor being further configured to cause the apparatus to remove the first OCC sequence from the least squares channel estimate, thereby generating the first signal by Equation 2.

In some embodiments, the non-transitory instructions that cause the apparatus to determine at least the estimated timing offset of the first signal includes the processor being further configured to cause the apparatus to determine at least the estimated timing offset of the first signal by Equation 3, and a timing advance is determined by Equation 4.

In some embodiments, the non-transitory instructions that cause the apparatus to adjust the first timing of the least squares channel estimate based on at least the estimated timing offset, thereby generating the second signal with the adjusted timing includes the processor being further configured to cause the apparatus to adjust the first timing of the least squares channel estimate based on at least the estimated timing offset, thereby generating the second signal with the adjusted timing by Equation 5.

In some embodiments, the non-transitory instructions that cause the apparatus to remove the second OCC sequence from the second signal, thereby generating the third signal includes the processor being further configured to cause the apparatus to remove the second OCC sequence from the second signal, thereby generating the third signal by Equation 6.

In some embodiments, the non-transitory instructions that cause the apparatus to determine the channel estimate of the channel based on the third signal includes the processor being further configured to cause the apparatus to determine the channel estimate of the channel based on the third signal by Equation 7A.

Still another aspect of this description relates to a computer-readable medium. In some embodiments, the computer-readable medium includes instructions executable by a controller of a system to cause the system to perform operations including determining a least squares channel estimate of a channel, the channel being configured to receive a first received signal, the first received signal including a demodulation reference signal (DMRS) symbol sequence, a number of DMRS symbols, and a number of subcarriers. In some embodiments, the computer-readable medium includes instructions executable by the controller of the system to further cause the system to perform operations including removing a first Orthogonal cover code (OCC) sequence from the least squares channel estimate, thereby generating a first signal. In some embodiments, the computer-readable medium includes instructions executable by the controller of the system to further cause the system to perform operations including determining at least an estimated timing offset of the first signal. In some embodiments, the computer-readable medium includes instructions executable by the controller of the system to further cause the system to perform operations including adjusting a first timing of the least squares channel estimate based on at least the estimated timing offset, thereby generating a second signal with an adjusted timing. In some embodiments, the computer-readable medium includes instructions executable by the controller of the system to further cause the system to perform operations including removing a second OCC sequence from the second signal, thereby generating a third signal. In some embodiments, the computer-readable medium includes instructions executable by the controller of the system to further cause the system to perform operations including determining a channel estimate of the channel based on the third signal. In some embodiments, the computer-readable medium includes instructions executable by the controller of the system to further cause the system to perform operations including determining a first noise power of the first received signal based on at least the channel estimate, the first received signal or the DMRS symbol sequence. In some embodiments, the computer-readable medium includes instructions executable by the controller of the system to further cause the system to perform operations including determining a first signal power of the first received signal based on at least the channel estimate. In some embodiments, the computer-readable medium includes instructions executable by the controller of the system to further cause the system to perform operations including determining a signal to noise ratio (SNR) of the first received signal based on the first noise power and the first signal power. In some embodiments, the computer-readable medium includes instructions executable by the controller of the system to further cause the system to perform operations including determining an adjusted data rate of the channel based on the SNR. In some embodiments, the computer-readable medium includes instructions executable by the controller of the system to further cause the system to perform operations including sending a signal based on the adjusted data rate of the channel, the signal instructing a device to adjust a data rate to the adjusted data rate.

In some embodiments, the instructions executable by the controller of the system cause the controller to perform operations including determining the least squares channel estimate of the channel includes the controller being further configured to perform operations including determining the least squares channel estimate of the channel by Equation 1.

In some embodiments, the instructions executable by the controller of the system cause the controller to perform operations including removing the first OCC sequence from the least squares channel estimate, thereby generating the first signal includes the controller being further configured to perform operations including removing the first OCC sequence from the least squares channel estimate, thereby generating the first signal by Equation 2.

In some embodiments, the instructions executable by the controller of the system cause the controller to perform operations including determining at least the estimated timing offset of the first signal includes the controller being further configured to perform operations including determining at least the estimated timing offset of the first signal by Equation 3, and a timing advance is determined by Equation 4.

In some embodiments, the instructions executable by the controller of the system cause the controller to perform operations including adjusting the first timing of the least squares channel estimate based on at least the estimated timing offset, thereby generating the second signal with the adjusted timing includes the controller being further configured to perform operations including adjusting the first timing of the least squares channel estimate based on at least the estimated timing offset, thereby generating the second signal with the adjusted timing by Equation 5.

In some embodiments, the instructions executable by the controller of the system cause the controller to perform operations including removing the second OCC sequence from the second signal, thereby generating the third signal includes the controller being further configured to perform operations including removing the second OCC sequence from the second signal, thereby generating the third signal by Equation 6.

In some embodiments, the instructions executable by the controller of the system cause the controller to perform operations including determining the channel estimate of the channel based on the third signal includes the controller being further configured to perform operations including determining the channel estimate of the channel based on the third signal by Equation 7A.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   determining, by a processor of a receiver, a least squares channel estimate of a channel, the channel being configured to receive a first received signal, the first received signal including a demodulation reference signal (DMRS) symbol sequence, a number of DMRS symbols, and a number of subcarriers;
   removing, by the processor, a first Orthogonal cover code (OCC) sequence from the least squares channel estimate, thereby generating a first signal;
   determining, by the processor, at least an estimated timing offset of the first signal;
   adjusting, by the processor, a first timing of the least squares channel estimate based on at least the estimated timing offset, thereby generating a second signal with an adjusted timing;
   removing, by the processor, a second OCC sequence from the second signal, thereby generating a third signal;
   determining, by the processor, a channel estimate of the channel based on the third signal;
   determining, by the processor, a first noise power of the first received signal based on at least the channel estimate, the first received signal or the DMRS symbol sequence;
   determining, by the processor, a first signal power of the first received signal based on at least the channel estimate;
   determining, by the processor, a signal to noise ratio (SNR) of the first received signal based on the first noise power and the first signal power;
   adjusting a data rate of the channel based on the SNR; and
   transmitting, by a transmitter, an output signal based on an adjusted data rate of the channel based on the SNR.

2. The method of claim 1, wherein determining the least squares channel estimate of the channel comprises:
   determining the least squares channel estimate of the channel by Equation 1 as follows:

$$H_{LS}(k, l) = Y_{DMRS}(k, l) * conj(X_{DMRS}(k, l)), \quad \text{(Equation 1)}$$

where
   $H_{LS}(k, l)$ is the least squares channel estimate of the channel,
   k is the number of subcarriers,
   l is the number of DMRS symbols,
   $Y_{DMRS}(k, l)$ is the first received signal,
   $X_{DMRS}(k, l)$ is the DMRS symbol sequence, and
   $conj(X_{DMRS}(k, l))$ is the conjugate of the DMRS symbol sequence $X_{DMRS}(k, l)$.

3. The method of claim 2, wherein removing the first OCC sequence from the least squares channel estimate, thereby generating the first signal comprises:
   removing the first OCC sequence from the least squares channel estimate, thereby generating the first signal by Equation 2 as follows:

$$H_{deOcc1}(k, l) = fn1(H_{LS}(k, l)), \quad \text{(Equation 2)}$$

where
   $H_{deOcc1}(k, l)$ is the first signal, and
   $fn1(H_{LS}(k, l))$ is a first orthogonal cover code removal (deOCC) function.

4. The method of claim 3, wherein determining at least the estimated timing offset of the first signal comprises:
   determining at least the estimated timing offset of the first signal by Equation 3 as follows:

$$\text{Omega} = \tan^{-1}\left(\frac{imag(TA_{metric})}{real(TA_{metric})}\right), \quad \text{(Equation 3)}$$

where
   Omega is the estimated timing offset of the first signal, and
   $TA_{metric}$ is a timing advance, and is determined by Equation 4 as follows:

$$TA_{metric} = E(H_{deOcc1}(k, l) * conj(H_{deOcc1}(k + u, l))), \quad \text{(Equation 4)}$$

where
   $E(H_{deOcc1}(k, l)*conj(H_{deOcc1}(k+u, l))$ is the expected value of the product of the first signal and the conjugate of an intermediary signal ($H_{deOcc1}(k+u, l)$), and
   u is a fixed offset.

5. The method of claim 4, wherein adjusting the first timing of the least squares channel estimate based on at least the estimated timing offset, thereby generating the second signal with the adjusted timing comprises:
   adjusting the first timing of the least squares channel estimate based on at least the estimated timing offset, thereby generating the second signal with the adjusted timing by Equation 5 as follows:

$$EstH_{LS}(k, l) = H_{LS}(k, l) * e^{-\frac{jOmega}{u*(FFT\_Size)}}, \quad \text{(Equation 5)}$$

where
   $EstH_{LS}(k, l)$ is the second signal with the adjusted timing,
   $H_{LS}(k, l)$ is the least squares channel estimate of the channel, $$e^{-\frac{jOmega}{u*(FFT\_Size)}}$$

is the adjusted timing,
   FFT_Size is a size of a fast Fourier transform (FFT).

6. The method of claim 5, wherein removing the second OCC sequence from the second signal, thereby generating the third signal comprises:
removing the second OCC sequence from the second signal, thereby generating the third signal by Equation 6 as follows:

$$H_{deOcc2}(k, l) = fn2(EstH_{LS}(k, l)), \quad \text{(Equation 6)}$$

where
$H_{deOcc2}(k, l)$ is the third signal, and
$fn2(EstH_{LS}(k, l))$ is a second deOCC function.

7. The method of claim 6, wherein determining the channel estimate of the channel based on the third signal comprises:
determining the channel estimate of the channel based on the third signal by Equation 7 as follows:

$$H_{Est}(k, l) = fn3(H_{deOcc2}(k, l)), \quad \text{(Equation 7)}$$

where
$H_{EST}(k, l)$ is the channel estimate, and
$fn3(H_{deOcc2}(k,l))$ is a channel estimate function.

8. An apparatus, comprising:
a memory having non-transitory instructions stored therein; and
a transceiver coupled to the memory; and
a processor coupled to the memory, and being configured to execute the non-transitory instructions, thereby causing the apparatus to:
determine a least squares channel estimate of a channel, the channel being configured to receive a first received signal, the first received signal including a demodulation reference signal (DMRS) symbol sequence, a number of DMRS symbols, and a number of subcarriers;
remove a first Orthogonal cover code (OCC) sequence from the least squares channel estimate, thereby generating a first signal;
determine at least an estimated timing offset of the first signal;
adjust a first timing of the least squares channel estimate based on at least the estimated timing offset, thereby generating a second signal with an adjusted timing;
remove a second OCC sequence from the second signal, thereby generating a third signal;
determine a channel estimate of the channel based on the third signal;
determine a first noise power of the first received signal based on at least the channel estimate, the first received signal or the DMRS symbol sequence;
determine a first signal power of the first received signal based on at least the channel estimate;
determine a signal to noise ratio (SNR) of the first received signal based on the first noise power and the first signal power; and
determine an adjusted data rate of the channel based on the SNR; and
the transceiver is configured to:
send a signal based on the adjusted data rate of the channel, the signal instructing a device to adjust a data rate to the adjusted data rate.

9. The apparatus of claim 8, wherein the non-transitory instructions that cause the apparatus to determine the least squares channel estimate of the channel comprises the processor being further configured to cause the apparatus to:
determine the least squares channel estimate of the channel by Equation 1 as follows:

$$H_{LS}(k, l) = Y_{DMRS}(k, l) * conj(x_{DMRS}(k, l)), \quad \text{(Equation 1)}$$

where
$H_{LS}(k, l)$ is the least squares channel estimate of the channel,
k is the number of subcarriers,
l is the number of DMRS symbols,
$Y_{DMRS}(k, l)$ is the first received signal,
$X_{DMRS}(k, l)$ is the DMRS symbol sequence, and
$conj(X_{DMRS}(k, l))$ is the conjugate of the DMRS symbol sequence $X_{DMRS}(k, l)$.

10. The apparatus of claim 9, wherein the non-transitory instructions that cause the apparatus to remove the first OCC sequence from the least squares channel estimate, thereby generating the first signal comprises the processor being further configured to cause the apparatus to:
remove the first OCC sequence from the least squares channel estimate, thereby generating the first signal by Equation 2 as follows:

$$H_{deOcc1}(k, l) = fn1(H_{LS}(k, l)), \quad \text{(Equation 2)}$$

where
$H_{deOcc1}(k, l)$ is the first signal, and
$fn1(H_{LS}(k, l))$ is a first orthogonal cover code removal (deOCC) function.

11. The apparatus of claim 10, wherein the non-transitory instructions that cause the apparatus to determine at least the estimated timing offset of the first signal comprises the processor being further configured to cause the apparatus to:
determine at least the estimated timing offset of the first signal by Equation 3 as follows:

$$\text{Omega} = \tan^{-1}\left(\frac{imag(TA_{metric})}{real(TA_{metric})}\right), \quad \text{(Equation 3)}$$

where
Omega is the estimated timing offset of the first signal, and
$TA_{metric}$ is a timing advance, and is determined by Equation 4 as follows:

$$TA_{metric} = E(H_{deOcc1}(k, l) * conj(H_{deOcc1}(k + u, l)), \quad \text{(Equation 4)}$$

where
$E(H_{deOcc1}(k, l)*conj(H_{deOcc1}(k+u, l))$ is the expected value of the product of the first signal and the conjugate of an intermediary signal ($H_{deOcc1}(k+u, l)$), and
u is a fixed offset.

12. The apparatus of claim 11, wherein the non-transitory instructions that cause the apparatus to adjust the first timing of the least squares channel estimate based on at least the estimated timing offset, thereby generating the second signal with the adjusted timing comprises the processor being further configured to cause the apparatus to:

adjust the first timing of the least squares channel estimate based on at least the estimated timing offset, thereby generating the second signal with the adjusted timing by Equation 5 as follows:

$$EstH_{LS}(k, l) = H_{LS}(k, l) * e^{-\frac{jOmega}{u*(FFT\_Size)}},\quad \text{(Equation 5)}$$

where $EstH_{LS}(k, l)$ is the second signal with the adjusted timing, $H_{LS}(k, l)$ is the least squares channel estimate of the channel, $$e^{-\frac{jOmega}{u*(FFT\_Size)}}$$

is the adjusted timing,

FFT_Size is a size of a fast Fourier transform (FFT).

13. The apparatus of claim 12, wherein the non-transitory instructions that cause the apparatus to remove the second OCC sequence from the second signal, thereby generating the third signal comprises the processor being further configured to cause the apparatus to:

remove the second OCC sequence from the second signal, thereby generating the third signal by Equation 6 as follows:

$$H_{deOcc2}(k, l) = fn2(EstH_{LS}(k, l)),\quad \text{(Equation 6)}$$

where $H_{deOcc2}(k, l)$ is the third signal, and $fn2(EstH_{LS}(k, l))$ is a second deOCC function.

14. The apparatus of claim 13, wherein the non-transitory instructions that cause the apparatus to determine the channel estimate of the channel based on the third signal comprises the processor being further configured to cause the apparatus to:

determine the channel estimate of the channel based on the third signal by Equation 7 as follows:

$$H_{Est}(k, l) = fn3(H_{deOcc2}(k, l)),\quad \text{(Equation 7)}$$

where $H_{EST}(k, l)$ is the channel estimate, and $fn3(H_{deOcc2}(k, l))$ is a channel estimate function.

15. A computer-readable medium including instructions executable a system to cause the system to perform operations comprising:

determining a least squares channel estimate of a channel, the channel being configured to receive a first received signal, the first received signal including a demodulation reference signal (DMRS) symbol sequence, a number of DMRS symbols, and a number of subcarriers;

removing a first Orthogonal cover code (OCC) sequence from the least squares channel estimate, thereby generating a first signal;

determining at least an estimated timing offset of the first signal;

adjusting a first timing of the least squares channel estimate based on at least the estimated timing offset, thereby generating a second signal with an adjusted timing;

removing a second OCC sequence from the second signal, thereby generating a third signal;

determining a channel estimate of the channel based on the third signal;

determining a first noise power of the first received signal based on at least the channel estimate, the first received signal or the DMRS symbol sequence;

determining a first signal power of the first received signal based on at least the channel estimate;

determining a signal to noise ratio (SNR) of the first received signal based on the first noise power and the first signal power;

determining an adjusted data rate of the channel based on the SNR; and sending a signal based on the adjusted data rate of the channel, the signal instructing a device to adjust a data rate to the adjusted data rate.

16. The computer-readable medium of claim 15, wherein the instructions executable by the system cause the system to perform operations comprising determining the least squares channel estimate of the channel comprises the system being further configured to perform operations comprising:

determining the least squares channel estimate of the channel by Equation 1 as follows:

$$H_{LS}(k, l) = Y_{DMRS}(k, l) * conj(x_{DMRS}(k, l)),\quad \text{(Equation 1)}$$

where $H_{LS}(k, l)$ is the least squares channel estimate of the channel, k is the number of subcarriers, l is the number of DMRS symbols, $Y_{DMRS}(k, l)$ is the first received signal, $X_{DMRS}(k, l)$ is the DMRS symbol sequence, and $conj(X_{DMRS}(k, l))$ is the conjugate of the DMRS symbol sequence $X_{DMRS}(k, l)$.

17. The computer-readable medium of claim 16, wherein the instructions executable by the system cause the system to perform operations comprising removing the first OCC sequence from the least squares channel estimate, thereby generating the first signal comprises the system being further configured to perform operations comprising:

removing the first OCC sequence from the least squares channel estimate, thereby generating the first signal by Equation 2 as follows:

$$H_{deOcc1}(k, l) = fn1(H_{LS}(k, l)),\quad \text{(Equation 2)}$$

where $H_{deOcc1}(k, l)$ is the first signal, and $fn1(H_{LS}(k, l))$ is a first orthogonal cover code removal (deOCC) function.

18. The computer-readable medium of claim 17, wherein the instructions executable by the system cause the system to perform operations comprising determining at least the estimated timing offset of the first signal comprises the system being further configured to perform operations comprising:
  determining at least the estimated timing offset of the first signal by Equation 3 as follows:

$$\text{Omega} = \tan^{-1}\left(\frac{imag(TA_{metric})}{real(TA_{metric})}\right), \quad \text{(Equation 3)}$$

where
  Omega is the estimated timing offset of the first signal, and
  $TA_{metric}$ is a timing advance, and is determined by Equation 4 as follows:

$$TA_{metric} = E(H_{deOcc1}(k, l) * conj(H_{deOcc1}(k+u, l)), \quad \text{(Equation 4)}$$

where
  $E(H_{deOcc1}(k, l)*conj(H_{deOcc1}(k+u, l))$ is the expected value of the product of the first signal and the conjugate of an intermediary signal ($H_{deOcc1}(k+u, l)$), and
  u is a fixed offset.

19. The computer-readable medium of claim 18, wherein the instructions executable by the system cause the system to perform operations comprising adjusting the first timing of the least squares channel estimate based on at least the estimated timing offset, thereby generating the second signal with the adjusted timing comprises the system being further configured to perform operations comprising:
  adjusting the first timing of the least squares channel estimate based on at least the estimated timing offset, thereby generating the second signal with the adjusted timing by Equation 5 as follows:

$$EstH_{LS}(k, l) = H_{LS}(k, l) * e^{-\frac{jOmega}{u*(FFT\_Size)}}, \quad \text{(Equation 5)}$$

where
  $EstH_{LS}(k, l)$ is the second signal with the adjusted timing,
  $H_{LS}(k, l)$ is the least squares channel estimate of the channel, $$e^{-\frac{jOmega}{u*(FFT\_Size)}}$$

is the adjusted timing,
  FFT_Size is a size of a fast Fourier transform (FFT).

20. The computer-readable medium of claim 19, wherein the instructions executable by the system cause the system to perform operations comprising:
  removing the second OCC sequence from the second signal, thereby generating the third signal comprises the system being further configured to perform operations comprising: removing the second OCC sequence from the second signal, thereby generating the third signal by Equation 6 as follows:

$$H_{deOcc2}(k, l) = fn2(EstH_{LS}(k, l)), \quad \text{(Equation 6)}$$

where
  $H_{deOcc2}(k, l)$ is the third signal, and
  $fn2(EstH_{LS}(k, l))$ is a second deOCC function; and
determining the channel estimate of the channel based on the third signal comprises the system being further configured to perform operations comprising: determining the channel estimate of the channel based on the third signal by Equation 7 as follows:

$$H_{Est}(k, l) = fn3(H_{deOcc2}(k, l)), \quad \text{(Equation 7)}$$

where
  $H_{EST}(k, l)$ is the channel estimate, and
  $fn3(H_{deOcc2}(k, l))$ is a channel estimate function.

* * * * *